United States Patent [19]

Takahashi

[11] Patent Number: 4,914,716

[45] Date of Patent: Apr. 3, 1990

[54] BATTERY-OPERATED FACSIMILE MACHINE

[75] Inventor: Shuichi Takahashi, Sagamihara, Japan

[73] Assignee: Ricoh Company, Ltd., Tokyo, Japan

[21] Appl. No.: 70,236

[22] Filed: Jul. 6, 1987

[30] Foreign Application Priority Data

Jul. 5, 1986 [JP] Japan .............................. 61-157208
Jul. 7, 1986 [JP] Japan .............................. 61-158025

[51] Int. Cl.$^4$ .......................... H04B 1/16; H04B 1/06
[52] U.S. Cl. .................................. 455/343; 455/345; 379/100
[58] Field of Search .................... 455/39, 66, 345, 344, 455/343, 74, 228; 379/100; 358/286, 257

[56] References Cited

U.S. PATENT DOCUMENTS

| | | | |
|---|---|---|---|
| 4,038,651 | 7/1977 | McGraw | 379/100 |
| 4,258,387 | 3/1981 | Lemelson et al. | 379/100 |
| 4,506,386 | 3/1985 | Ichikawa et al. | 455/343 |
| 4,631,496 | 12/1986 | Borras et al. | 455/343 |
| 4,646,180 | 2/1987 | Iizuka et al. | 379/100 |
| 4,796,091 | 1/1989 | Nohtomi | 358/286 |

*Primary Examiner*—Reinhard J. Eisenzopf
*Assistant Examiner*—Curtis Kuntz
*Attorney, Agent, or Firm*—Oblon, Spivak, McClelland, Maier & Neustadt

[57] ABSTRACT

A mobile radio facsimile machine mounted on an automobile is powered by a battery of the automobile. The facsimile machine has a receiving unit for receiving data transmitted from a transmitter at a remote station, a memory for storing the received data and a recording unit for recording the received data. The facsimile machine also includes a first switch which allows power to be supplied from the battery to the receiving unit when turned on so that the receiving unit is set in an automatic reception mode. The facsimile machine also includes a second switch which allows power to be supplied from the battery to the recording unit when turned on. In one embodiment, both of the first and second switches are manually operable. Thus, only the first switch is turned on when the facsimile machine is left unattended to receive data automatically with only a small amount of power consumption. When the second switch is turned on, power is also supplied to the recording unit which normally requires a relatively large amount of power consumption. However, the engine of the automobile may also be started to run at the same time when the second switch is turned on so that the battery is prevented from loosing too much power.

22 Claims, 3 Drawing Sheets

BATTERY-OPERATED FACSIMILE MACHINE

BACKGROUND OF THE INVENTION

1. Field of the Invention

This invention generally relates to a communication apparatus which is powered by a rechargeable battery, and, in particular, to a battery-operated communication apparatus, such as a facsimile machine powered by a battery, which may be mounted on a vehicle, such as an automobile.

2. Description of the Prior Art

It is often desired that a communication apparatus, such as a facsimile machine or a data communication machine, be movable in location. For example, such a communication apparatus is sometimes desired to be carried on a vehicle, such as an automobile, so that it can transmit or receive data to or from another communication apparatus, for example, at a central station. In such a case, the power required to operate the communication apparatus carried on the vehicle must be supplied from a battery which is also mounted on the vehicle. Since the vehicle is normally equipped with a rechargeable battery, it is common sense to use such a rechargeable battery to supply power to the communication apparatus.

As well known in the art, such a rechargeable battery is kept charged by a power generator which is driven to rotate by an internal combustion engine of the vehicle. Thus, while the engine of the vehicle is in operation, the power may be constantly supplied to the communication apparatus because the battery is recharged by the power generator whenever its power storage has decreased beyond a predetermined level.

In the case of a communication apparatus, such as a facsimile machine or a data communication apparatus, there is normally provided an automatic reception function for receiving transmitted data automatically. In such a case, the communication apparatus includes a call detector which constantly receives a minute amount of power from the battery, and the rest of the apparatus is not powered during the stand-by mode during which neither transmission nor reception is carried out. Upon receipt of a call from a remote source station, the call detector sends a detection signal to a main controller of the communication apparatus so that the entire apparatus becomes powered to get ready for receiving data transmitted. The power supplied to the entire apparatus is much larger than the power supplied to the caller detector. In addition, when the apparatus operates in a transmission mode or reception mode, its reading unit or recording unit is normally driven so that there is required more power to be supplied.

If such a communication apparatus equipped with an automatic reception function is mounted on a vehicle, the battery may be used excessively and become dead if the vehicle is left in a parking lot and thus its engine is not operating. In this case, the battery is not capable of supplying enough power to get the engine started even if the ignition key of the vehicle is switched on, which is disadvantageous. On the other hand, if the automatic reception function of the communication apparatus is made inoperative while the engine is not in operation, a chance of receiving transmitted information may be lost, and, thus, this is not acceptable, either. It is not conceivable to keep the engine running at all times because there is a possibility of danger and it will amount to wasteful consumption of gasoline.

SUMMARY OF THE INVENTION

In accordance with the present invention, there is provided a communication apparatus, such as a facsimile machine, which is powered by an independent power storing means, such as a battery. The communication apparatus has an automatic reception function and includes data storing means for storing data received from a transmitting station. When the communication apparatus receives data in an automatic reception mode, the data received is stored in the data storing means and is not supplied to an output means of the communication apparatus. The communication apparatus also includes switch means and when the switch means is manually operated by the operator, the data stored in the data storing means is output by the output means, such as a recording unit for providing a recorded image on a sheet of plain paper.

It is therefore a primary object of the present invention to obviate the disadvantages of the prior art and to provide an improved battery-operated communication apparatus.

Another object of the present invention is to provide an improved battery-operated communication apparatus which can implement an automatic reception function without using the power of a battery excessively.

A further object of the present invention is to provide an improved battery-operated facsimile machine which can carry out an automatic reception function.

Other objects, advantages and novel features of the present invention will become apparent from the following detailed description of the invention when considered in conjunction with the accompanying drawings.

BRIEF DESCRIPTION OF THE DRAWINGS

FIG. 4 is an illustration showing an example of printout of received data produced by the recording unit of the facsimile machine shown in FIG. 3.

DESCRIPTION OF THE PREFERRED EMBODIMENTS

Figure 2:
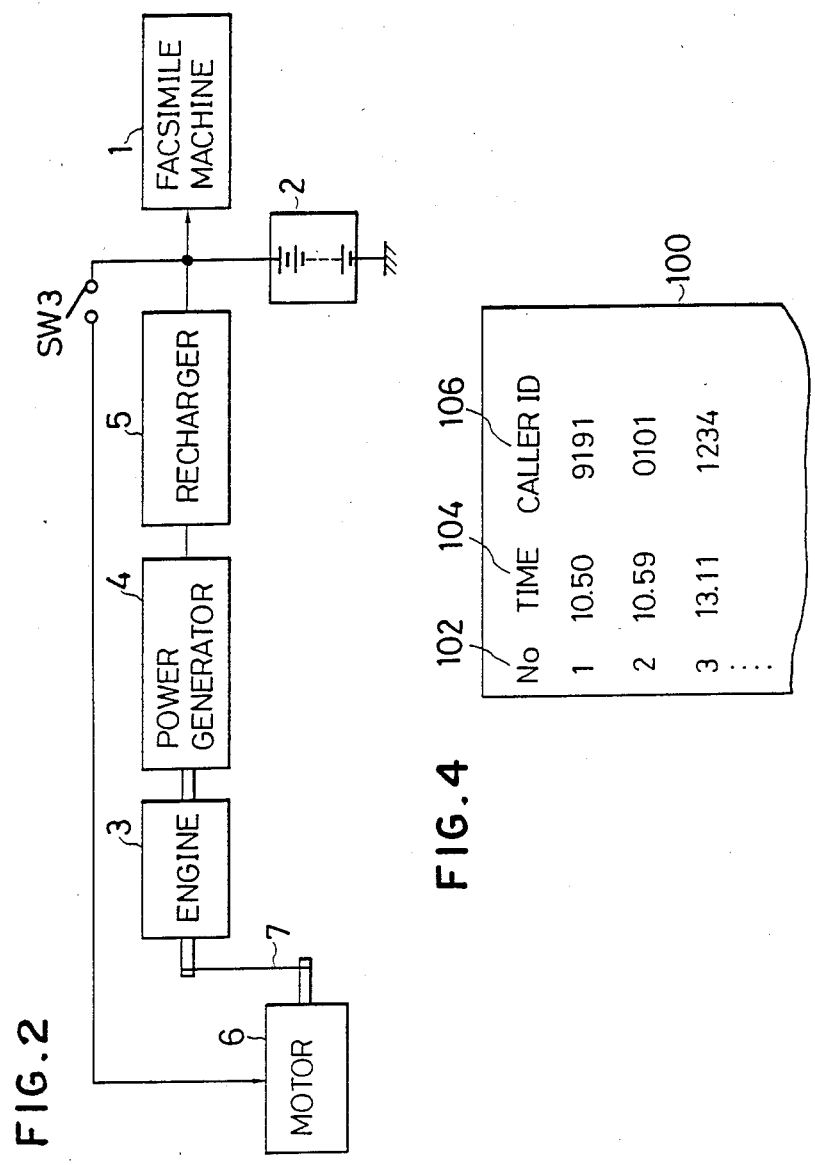
FIG. 2 is a block diagram showing a system of application when the facsimile machine illustrated in FIG. 1 is mounted on an automobile.

Referring first to FIG. 2, there is shown in block form a system of application of a facsimile machine constructed in accordance with one embodiment of the present invention. In the illustrated example, a facsimile machine 1 is mounted on an automobile, thereby providing a mobile facsimile machine system. As shown, the facsimile machine 1 is connected to receive its power from a battery 2 of the automobile, which also carries an internal combustion engine 3, a power generator 4 driven to rotate by the engine 3 and a recharger 5 driven by the power generator 4 to recharge the battery 2. Thus, while the engine 3 is in operation, the battery 2 is constantly kept charged, so that power may be constantly supplied to the facsimile machine 1. The engine 3 is also operatively coupled to a starter motor 6 via an endless belt 7, and the motor 6 is connected to the battery 2 through a start switch SW3. Thus, when the start switch SW3 is manually operated by the operator to be closed, the power is supplied from the battery to the motor 6, thereby causing the engine 3 to start running. As soon as the engine 3 starts running, the power generator 4 is driven to rotate, so that the battery 2 is recharged.

Figure 1:
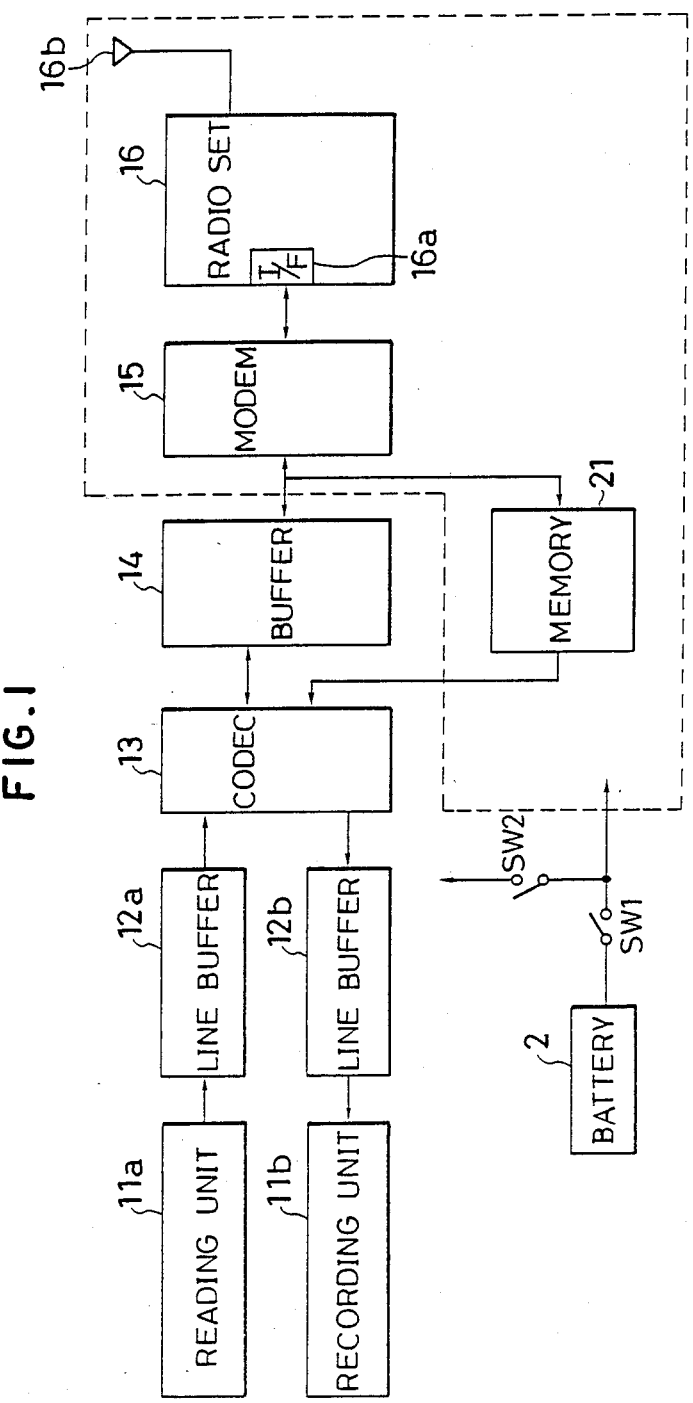
FIG. 1 is a block diagram showing a facsimile machine constructed in accordance with one embodiment of the present invention.

FIG. 1 shows in block form the detailed structure of the facsimile machine 1 provided in the system of FIG. 2. As shown in FIG. 1, the battery 2 is connected to a radio set 16, a MODEM 15 and a memory 21 through a first switch SW1; on the other hand, the battery 2 is connected to the rest of the structure of the present facsimile machine through the first switch SW1 and also a second switch SW2. When the operator leaves the automobile equipped with the present radio facsimile machine 1, the first switch SW1 is closed, so that power is constantly supplied to the radio set 16, MODEM 15 and memory 21 from the battery, thereby permitting an automatic reception function to be carried out. As a result, the data received by automatic reception function will be stored in the memory 21. On the other hand, when the operator returns to the automobile, both of the first and second switches SW1 and SW2 are closed, so that power is also supplied to the rest of the facsimile machine 1 from the battery 2. As a result, the data stored in the memory 21 may be supplied to a recording unit for providing a printout of the received data.

It is to be noted that the radio set 16, MODEM 15 and memory 21, which are enclosed by the dotted line, may be formed by semiconductor devices, such as ICs and LSIs, which consume a minimum amount of power. Thus, the total power consumption of these elements is very small, so that they may be kept in operation even during stand-by mode. Thus, even if the battery 2 constantly supplies power to these elements, the battery 2 does not loose significant amount of energy, so that there will be no problem. Alternatively, these elements, including radio set 16, MODEM 15 and memory 21, may be powered by a separate small battery, such as a Cd battery or the like.

The facsimile machine 1 shown in FIG. 1 is a radio facsimile machine and thus it employs the radio set 16. It should be noted, however, that use may be made of any other types of facsimile machines, such as G2 or G3 type facsimile machine described in the CCITT recommendations, for the facsimile machine 1 of FIG. 1.

The radio facsimile machine of FIG. 1 includes a reading unit 11a which is typically comprised of an image sensor which includes a plurality of photoelectric elements arranged in the form of a single array, so that an original image may be optically read in the form of raster scanning and image information thus read is supplied to a line buffer 12a line by line. The line buffer 12a is a line memory for temporarily storing a line of the image data supplied from the reading unit 11a. As well known in the art, a relative motion is produced between the original image and the reading unit 11a and the direction of this relative motion is typically normal to the longitudinal direction of the image sensor. Thus, the reading unit 11a reads the original image line by line at a predetermined pitch as the original image is moved relative to the reading unit 11a or vice versa.

The image data temporarily stored in the line buffer 12a is then supplied to a CODEC 13 where the image data is arranged in the form of a predetermined frame and then subjected to compression processing, thereby being converted into codes. On the other hand, when the CODEC 13 receives data transmitted from a remote transmitting station, it causes the received data to be deframed and also decompressed to reconstruct the image data.

The facsimile machine of FIG. 1 also includes another line buffer 12b which stores received image data line by line temporarily. The image data stored in the line buffer 12b is supplied to a recording unit 11b where the image data is recorded on a sheet of recording medium, such as paper. The recording unit 11b may be a display, such as a CRT display or a liquid crystal display, or, alternatively, the recording unit 11b may include two or more different types of recorders, such as a thermal printer and a CRT display. Also provided in the facsimile machine of FIG. 1 is a buffer 14 which is comprised of a memory for temporarily storing facsimile data received or to be transmitted. The MODEM 15 is interposed between the buffer 14 and the radio set 16 and it modulates the facsimile data to be transmitted suitably, thereby adapting the facsimile data to the characteristics of a transmission line to be used and demodulates the received facsimile data upon receipt. The radio set 16 is connected to the MODEM 15 via an interface unit 16a, and during transmission mode, a signal from the MODEM 15 is suitably modulated and transmitted into the air from an antenna 16b. On the other hand, during reception mode, a signal is picked up by the antenna 16b, and after amplification, a predetermined signal is extracted and supplied to the MODEM 15 through the interface unit 16a. The interface unit 16a has a function of adjusting the signal level when a signal is transmitted between the radio set 16 and the MODEM 15.

The facsimile machine of FIG. 1 also includes the memory 21 for storing facsimile data which has been received in the automatic reception mode and demodulated by the MODEM 15. It is to be noted that, although not shown specifically, the facsimile machine of FIG. 1 also includes such components as a main controller, which may be preferably comprised of a microcomputer, and a control panel including various operational keys which can be operated by the operator to provide various instructions to the main controller of the facsimile machine.

In operation, when the operator leaves the automobile and thus the facsimile machine is left unattended, the operator operates the first switch SW1 to have it closed, so that power is constantly supplied to the radio set 16, MODEM 15 and memory 21 from the battery 2, thereby permitting to carry out an automatic reception function. When a facsimile signal transmitted from a transmitter at a remote place is received by the antenna 16b, it is amplified by the radio set 16 and supplied to the MODEM 15 via the interface unit 16a. The facsimile signal is demodulated at the MODEM 15 and then stored into the memory 21. Such an automatic reception function can be carried out because power is constantly supplied to the radio set 16, MODEM 15 and memory 21 from the battery 2 through the first switch SW1 which is now closed even if the facsimile machine is in an unattended condition. Under this condition, since power is not supplied to the remaining portion of the facsimile machine 1, such as buffer 14, CODEC 13, line buffer 12b, and recording unit 11b, from the battery 2 because the second switch SW2 is open, the facsimile signal demodulated by the MODEM 15 is not supplied to the buffer 14. It should also be noted that the power required for operating the radio set 16, MODEM 15 and memory 21 is very small and thus the energy stored in the battery 2 is not consumed substantially.

As described above, the facsimile data thus received is not supplied to the recording unit 11b but simply stored and kept in the memory 21. When the operator returns to the automobile and additionally operates the second switch SW2 to have it closed, the power from the battery is now supplied not only to the radio set 16, MODEM 15 and memory 21, but also to the remaining portion of the facsimile machine 1, including the buffer 14, CODEC 13, line buffer 12b and recording unit 11b. As a result, the facsimile data stored in the memory 21 is supplied to the CODEC 13 where the facsimile data is deframed and decompressed to reconstruct the original facsimile image signal, which is then supplied to the line buffer 12b. Thus, the facsimile image signal is supplied to the recording unit 11b line by line via the line buffer 12b, so that there is obtained a recorded or printed image on a sheet of recording medium, such as paper. If the recording unit 11b additionally includes a display device, such as a CRT display device, the received facsimile image data is also displayed. In this manner, simply by operating the second switch SW1 upon return to the automobile, the operator can obtain a hard copy and/or a display of the received signal stored in the memory 21.

In the case when the received data stored in the memory 21 is read out ultimately to the recording unit 11b to obtain a hard copy of the received data, a substantial amount of power is required. Thus, when the operator closes the second switch SW2 in addition to the first switch SW1 so as to obtain a hard copy of the received image data stored in the memory 21, it is preferable for the operator to close the switch SW3 shown in FIG. 2 at the same time so as to start the engine 3 running. In this case, since the engine 3 is driven to run, the power generator 4 generates power which is then stored into the battery 2, so that the battery 2 may be prevented from losing power. Upon completion of recording, the operator may stop the engine 3 from running.

Figure 3:
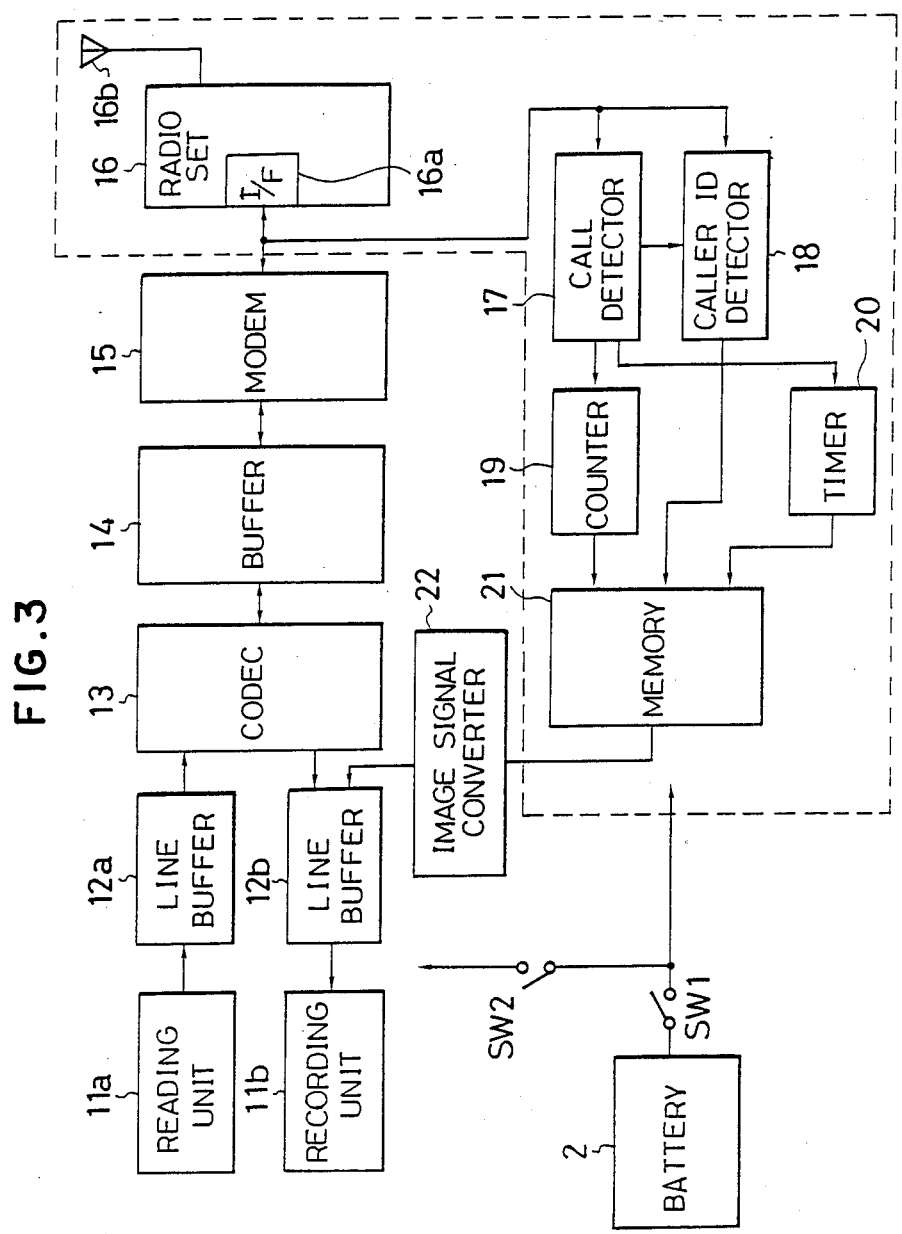
FIG. 3 is a block diagram showing a facsimile machine constructed in accordance with another embodiment of the present invention.

FIG. 3 shows a battery-operated mobile radio facsimile machine constructed in accordance with another embodiment of the present invention. It is to be noted that those elements of the structure shown in FIG. 3 which are identical to those of the structure shown in FIG. 1 are indicated by the same reference numbers. Importantly, in the structure shown in FIG. 3, a first switch SW1 is provided in a first power line between the battery 2 and those elements of the facsimile machine which are enclosed by the dotted line, and a second switch SW2 is provided in a second power line branching out from that portion of the first power line between the first switch SW1 and the elements enclosed by the dotted line. The first power line is to supply power to those elements enclosed by the dotted line from the battery 2, and the second power line is to supply power to the remaining portion of the facsimile machine from the battery 2. Thus, when the first switch SW1 is turned on and thus closed, power is supplied from the battery 2 to the elements enclosed by the dotted line. And, then, when the second switch SW2 is turned on and thus closed in addition to the first switch SW1, power from the battery 2 is supplied not only to those elements enclosed by the dotted line but also to the remaining elements of the present facsimile machine.

In the present embodiment, the elements of the facsimile machine enclosed by the dotted line include a radio set 16, a call detector, a caller ID detector, a counter 19, a timer 20 and a memory 21. Thus, those elements are activated when the first switch SW1 is turned on. Since the present facsimile machine can be operated by a battery, it can be mounted on a vehicle, such as an automobile. For example, when the present facsimile machine is mounted on an automobile, and the operator goes away from the automobile, thereby leaving the present facsimile machine unattended, the operator turns the first switch SW1 on to have it closed. As a result, power is supplied from the battery 2 to the radio set 16, call detector 17, call ID detector 18, counter 19, timer 20 and memory 21 to have them activated, thereby permitting to carry out an automatic reception function. Thus, when a facsimile data is received in an automatic reception mode, the facsimile data is stored in the memory 21 and is not supplied to the recording unit 11b. When the operator returns to the automobile and turns on the second switch SW2, power is additionally supplied to the rest of the facsimile machine, so that the facsimile data stored in the memory 21 is supplied to the recording unit 11b via an image signal converter 22 and the line buffer 12b, thereby producing a hard copy of the received facsimile data.

It is to be noted that, similarly with the previously described embodiment, those elements enclosed by the dotted line which are powered when the first switch SW1 is turned on may be implemented by one or more of semiconductor devices in the form of ICs, LSIs or the like, so that those elements may be formed as a unit which consumes only a little amount of power. As a result, even if those elements are continuously powered by turning on the first switch SW1 on while the operator goes away to leave the facsimile machine unattended, the battery 2, such as an automobile battery, is not consumed significantly and would not become dead. It should be noted that a separate primary battery, which is not rechargeable and thus disposable, such as a Cd battery, may be used for supplying power to these elements enclosed by the dotted line. In this case, a switch may or may not be provided between such a primary battery and the elements enclosed by the dotted line, and only one switch is required to be provided between the battery 2 and the remaining portion of the facsimile machine.

In the facsimile machine shown in FIG. 3, use is made of the radio set 16; however, use may be made of an ordinary wired facsimile machine, such as G2 and G3 type machines disclosed in the CCITT recommendations, or any other type of facsimile machines.

During an automatic reception mode, an input signal received by the antenna 16b is supplied to the call detector 17 and also to the caller ID detector 18 via the interface unit 16a. The interface unit 16a has various functions, including a signal level converting function between the radio set 16 and the MODEM 15 and also between the radio set 16 and the call detector 17 and the caller ID detector 18. The call detector 17 detects the reception of a call from a transmitter at a remote station by a signal from the radio set 16 during an automatic reception mode. For example, a particular number, such as a telephone number, is assigned to each of a facsimile machine, and the call detector 17 detects that a facsimile signal sent from a transmitter at a remote station is directed to itself by identifying the assigned number contained in the facsimile signal. It is to be noted that the call detector 17 may also be provided in the radio set 16.

The counter 19 receives a detection signal from the call detector 17 and counts the number of calls detected by the call detector 17. The count of this counter 19 is supplied to the memory 21. The caller ID detector 18 detects the ID information of a transmitter when it is contained in a received signal during an automatic reception mode and supplies this information to the memory 21. Such ID information can be a code number, a series of alphabetical letters, or the like. The timer 20 also receives a detection signal from the call detector 17 upon detection of a call by the call detector 17 and supplies the information of time of detecting a call to the memory 21. Thus, the memory 21 stores such information as the call detected, number of calls, ID of transmitter, time of call reception, and the like, during an automatic reception mode.

The image signal converter 22 is powered by the battery 2 only when the operator has turned on the second switch SW2. And, when the image signal converter 22 is activated, the data stored in the memory 21 is read out into the image signal converter 22 where the data is converted into a predetermined format before being supplied to the line buffer 12b. It should be noted that, although not shown specifically, the present facsimile machine is also provided with other elements, such as a main controller, which is typically comprised of a microcomputer, for controlling the overall operation of the present facsimile machine, and a control panel including various keys through which the operator can provide various operational instructions to the present facsimile machine.

In operation, when the operator goes away to leave the present facsimile machine unattended, the operator turns on the first switch SW1 to have it closed, so that the present facsimile machine is set to be capable of carrying out an automatic reception operation because power is supplied to the limited elements, including the radio set 16, call detector 17, call ID detector 18, counter 19, timer 20 and memory 21, from the battery 2. When a facsimile data is received by the antenna 16b, the facsimile data is amplified by the radio set 16 and then supplied to the call detector 17 and also to the caller ID detector 18 via the interface unit 16a. When a call is detected by the call detector 17, a detection signal is supplied to the counter 19 and also to the caller ID detector 18 as well as to the timer 20. Upon reception of a call detection signal from the call detector 17, the counter 19 counts the number of received calls. That is, the counter 19 judges whether or not the current call is a first call after the automatic reception mode has been set and, if not the first call, determines the order in the number of calls which has been received since the automatic reception mode has been set, which information is supplied to the memory 21. Thus, the memory 21 stores the information of the fact that a call detection signal has been received and the order in the number of calls received.

The caller ID detector 18, in response to a call detection signal from the call detector, detects the ID of a transmitter transmitting the facsimile data just received. That is, in response to a call detection signal from the call detector 17, the caller ID detector 18 detects the information indicating the ID of the transmitter from the received facsimile data and supplies this information to the memory 21. And, thus, the memory 21 also stores this information. The timer 20 also receives a call detection signal from the call detector 17 and supplies information regarding the time of reception of the facsimile data in response to the call detection signal. Thus, the memory 21 also stores this information of time of reception.

When the operator returns to the automobile and would like to examine the data received and stored in the memory 21 in an automatic reception mode, the operator turns on the second switch SW2 additionally. Thus, power is also supplied to the rest of the facsimile machine, including the recording unit 11b, line buffer 12b and image signal converter 22, from the battery 2, so that a printout of the data stored in the memory 21 can be obtained by the recording unit 11b. That is, the data stored in the memory 21 is first supplied to the image signal converter 22 so that the data is converted into a predetermined format, and the thus converted data is then supplied to the line buffer 12b. The data is thus temporarily stored in the line buffer 12b and recorded on a sheet of recording medium, such as paper, by the recording unit 11b.

FIG. 4 illustrates one example of the data recorded on a sheet of recording medium by the recording unit 11b in a predetermined format. As illustrated, No. of Calls 102, Call Time 104 and Caller ID are recorded on a recording medium 100. With such a printout, the operator can determine what kind of information has been received in an automatic reception mode while the operator was away and thus can take appropriate action promptly as required. When the data received in an automatic reception mode is output to the recording unit 11b, typically, a relatively large amount of power is required by the recording unit 11b and thus the battery 2 will lose its stored energy. Thus, the operator can turn on the switch SW3 shown in FIG. 2 to start the engine 3 running. When the engine 3 is set in a running state, the power generator 4 is driven so that power is supplied and stored into the battery through the recharger 5. Thus, the battery 2 may be prevented from loosing too much energy even if the recording unit 11b is operated. Upon completion of producing a hard copy by the recording unit 11b, the operator may stop the engine 3 running.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile machine comprising:
   receiving means for receiving a data transmitted from a transmitter at a remote station, said receiving means having an automatic reception mode for receiving said data automatically;
   storing means for storing said data received by said receiving means;
   outputting means for outputting said data stored in said storing means; and
   power distribution controlling means for supplying power only to said receiving means and said storing means during said automatic reception mode;
   wherein said power distribution controlling means includes a first switch interposed between a rechargeable battery and said receiving means and said storing means, said first switch being operable so that power from said rechargeable battery is supplied to said receiving means and said storing means when said first switch is turned on and no power is supplied from said rechargeable battery to said receiving means and said storing means when said first switch is turned off;

wherein said power distribution controlling means includes a second switch interposed between said first switch and said outputting means, said second switch being operable so that power from said rechargeable battery is supplied to said outputting means when said second switch is turned on and no power is supplied from said rechargeable battery to said outputting means when said second switch is turned off.

2. The facsimile machine of claim 1 wherein said power distribution controlling means includes a separate power source for supplying power to said receiving means and said storing means.

3. The facsimile machine of claim 1 wherein at least one of said first and second switches is a manually operable switch.

4. Apparatus of claim 1 wherein said battery is an automobile battery.

5. The facsimile machine of claim 1 wherein said receiving means includes a call detector for detecting a call, a caller ID detector responsive to a call detection signal from said call detector for detecting identification of a transmitter of said call, a counter responsive to said call detection signal for counting the number of calls and a timer responsive to said call detection signal for detecting the time of reception of said call.

6. The facsimile machine of claim 5 wherein said storing means includes a memory for storing data from said call detector, said caller ID detector, said counter and said timer.

7. The facsimile machine of claim 6 wherein said receiving means further includes a radio set.

8. The facsimile machine of claim 1 wherein said receiving means includes a radio set and a MODEM connected to receive data from said radio set and said storing means includes a memory connected to receive data from said MODEM.

9. The facsimile machine of claim 1 wherein said outputting means includes a recording unit for recording said data in said storing means on a recording material.

10. The facsimile machine according to claim 1, wherein said output means comprises:
means for recording said data stored in said storing means on a sheet of recording paper; and
means for manually activating said recording means.

11. The facsimile machine according to claim 1, wherein said outputting means comprises:
means for recording said data stored in said storing means on a sheet of recording paper; and
means for activating said recording means while recharging of said rechargeable battery is being carried out by a battery recharger.

12. A facsimile machine comprising:
receiving means for receiving a data transmitted from a transmitter at a remote station, said receiving means having an automatic reception mode for receiving said data automatically;
storing means for storing said data received by said receiving means;
outputting means for outputting said data stored in said storing means; and
power distribution controlling means for supplying power only to said receiving means and said storing means during said automatic reception mode;
wherein said power distribution controlling means includes a first switch interposed between a rechargeable battery and said receiving means and said storing means, said first switch being operable so that power from said rechargeable battery is supplied to said receiving means and said storing means when said first switch is turned on and no power is supplied from said rechargeable battery to said receiving means and said storing means when said first switch is turned off;
wherein said receiving means includes a call detector for detecting a call, a caller ID detector responsive to a call detection signal from said call detector for detecting identification of a transmitter of said call, a counter responsive to said call detection signal for counting the number of calls and a timer responsive to said call detection signal for detecting the time of reception of said call.

13. The facsimile machine of claim 12, wherein said power distribution controlling means includes a separate power source for supplying power to said receiving means and said storing means.

14. The facsimile machine of claim 12, wherein said power distribution controlling means includes a second switch interposed between said first switch and said outputting means, said second switch being operable so that power from said rechargeable battery is supplied to said outputting means when said second switch is turned on and no power is supplied from said rechargeable battery to said outputting means when said second switch is turned off.

15. The facsimile machine of claim 14, wherein at least one of said first and second switches is a manually operable switch.

16. The facsimile machine of claim 12, wherein said battery is an automobile battery.

17. The facsimile machine of claim 12, wherein said storing means includes a memory for storing data from said call detector, said caller ID detector, said counter and said timer.

18. The facsimile machine of claim 17, wherein said receiving means further includes a radio set.

19. The facsimile machine of claim 12, wherein said receiving means includes a radio set and a MODEM connected to receive data from said radio set and said storing means includes a memory connected to receive data from said MODEM.

20. The facsimile machine of claim 12, wherein said outputting means includes a recording unit for recording said data in said storing means on a recording material.

21. The facsimile machine according to claim 12, wherein said output means comprises:
means for recording said data stored in said storing means on a sheet of recording paper; and
means for manually activating said recording means.

22. The facsimile machine according to claim 12, wherein said outputting means comprises:
means for recording said data stored in said storing means on a sheet of recording paper; and
means for activating said recording means while recharging of said rechargeable battery is being carried out by a battery recharger.

* * * * *